United States Patent
Kumar et al.

(10) Patent No.: US 6,697,826 B1
(45) Date of Patent: Feb. 24, 2004

(54) INFORMATION-HANDLING SYSTEM, METHOD, AND ARTICLE OF MANUFACTURE INCLUDING AND OBJECT SEARCH MECHANISM THAT PROVIDES CONSTRAINT-BASED FILTERING IN A DISTRIBUTED OBJECT SYSTEM

(75) Inventors: Vinoj Narayan Kumar, Austin, TX (US); Isabelle Marie Rouvellou, New York, NY (US); Donald Francis Ferguson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1470 days.

(21) Appl. No.: 08/619,060

(22) Filed: Mar. 20, 1996

(51) Int. Cl.[7] ............................................... G06F 17/30
(52) U.S. Cl. ................... 707/703 R; 717/169
(58) Field of Search .......................... 707/103, 103 R; 717/169

(56) References Cited

U.S. PATENT DOCUMENTS 5,519,868 A * 5/1996 Allen et al. ................. 717/169
5,577,252 A * 11/1996 Nelson et al. ............... 395/670
5,619,710 A * 4/1997 Travis, Jr. et al. .......... 395/800
6,044,379 A * 3/2000 Callsen .................... 707/103 R

* cited by examiner

Primary Examiner—Charles Rones
(74) Attorney, Agent, or Firm—David A. Mims, Jr.; Bracewell & Patterson, L.L.P.

(57) ABSTRACT

An information-handling system operable within a distributed object computing environment (DOCE) is disclosed that includes an object-based program for controlling object searching in a constraint-based filtering mode over said DOCE. The object-based program for controlling object searching further comprises means for providing hierarchical storage of a name/binding value during a search. Additionally, the object-based program includes a means for providing the addition of properties as name/value pair sequence to each node within a tree search performed by the object-based program. Further, the search mechanism includes means for providing recursive searching of the group properties as well as means for providing meta-knowledge of the class within the DOCE for attribute search. Moreover, the system includes means for invoking a base-filterable class, which introduces methods that verify whether an object satisfies a given filter, and where the base-filterable class further provides a filterable subclass that provides the methods needed to build a filter.

18 Claims, 7 Drawing Sheets

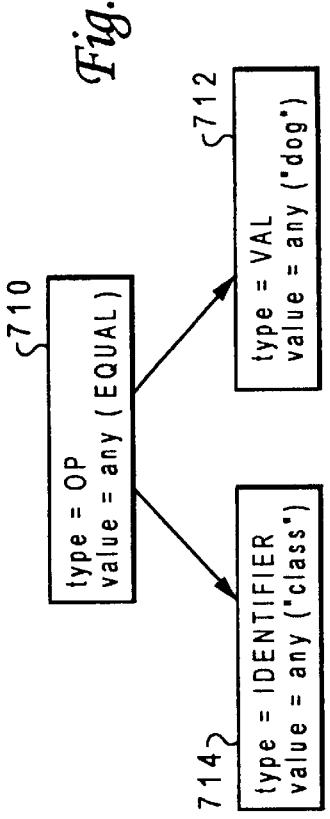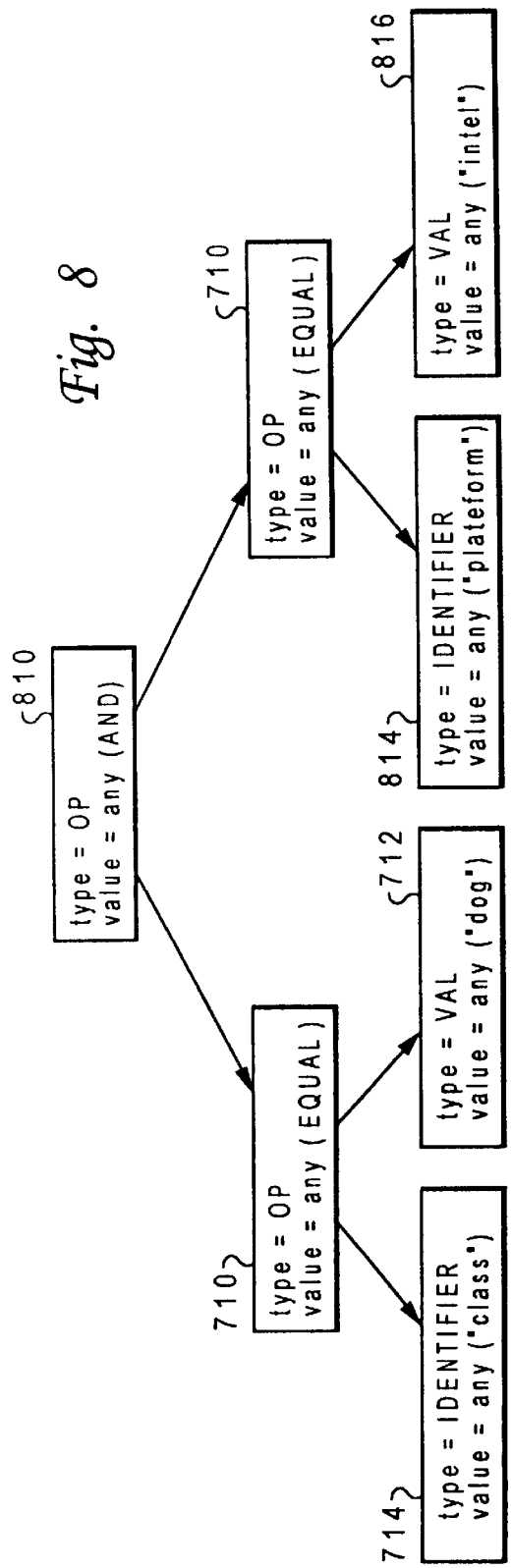

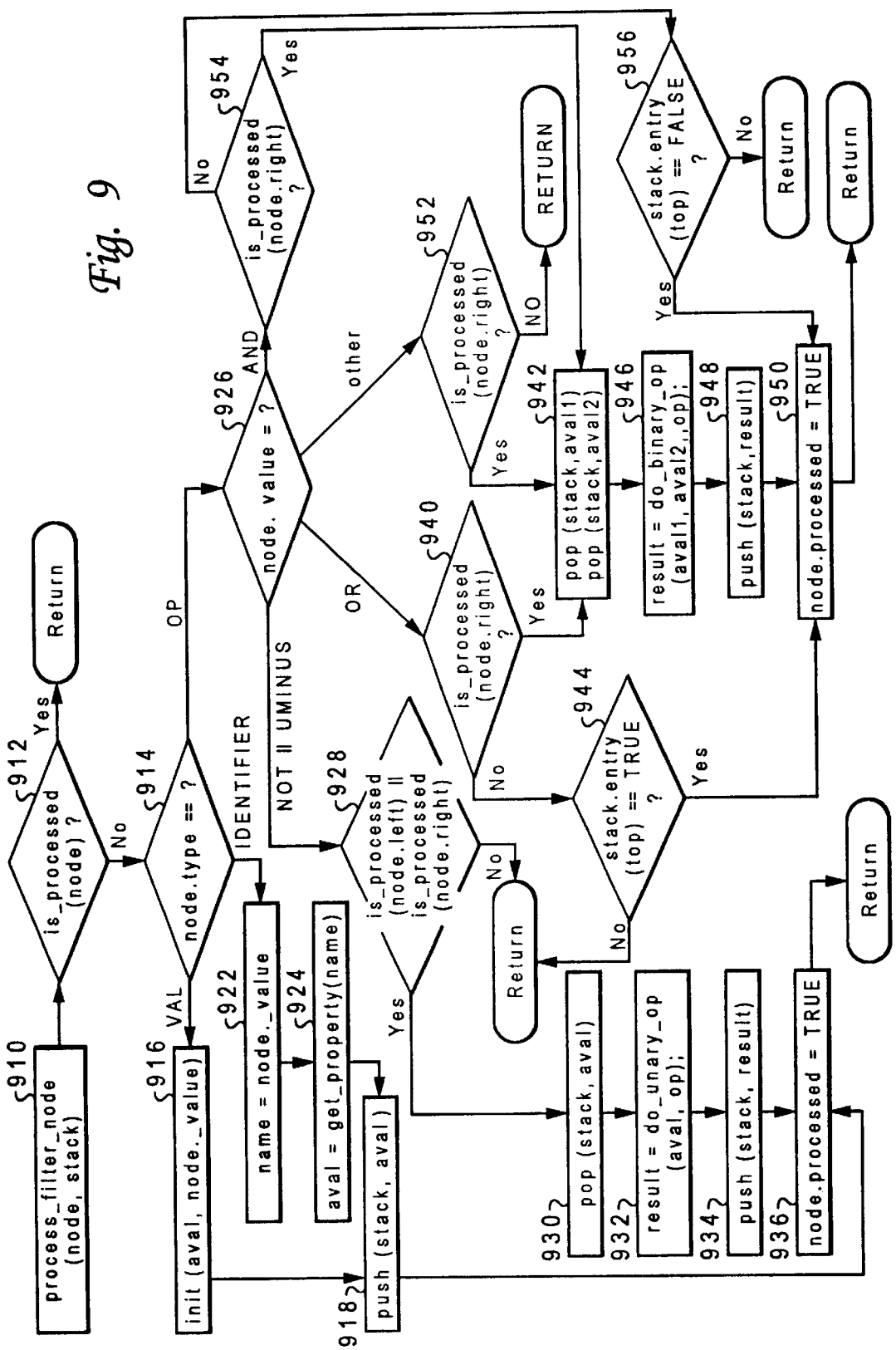

INFORMATION-HANDLING SYSTEM, METHOD, AND ARTICLE OF MANUFACTURE INCLUDING AND OBJECT SEARCH MECHANISM THAT PROVIDES CONSTRAINT-BASED FILTERING IN A DISTRIBUTED OBJECT SYSTEM

BACKGROUND OF THE INVENTION

1. Technical Field

The present invention relates to information-handling systems, methods and articles of manufacture, and more particularly, to information-handling systems and methods for implementing object search services for use in a distributed object system.

2. Background of the Invention

A related application (Ser. No. 08/554,063), herein incorporated by reference for all purposes, teaches and claims the use of an information-handling system, method and article of manufacture for controlling execution of program modules represented by one or more objects, the object-based program comprising one or more extended naming context objects for improving system performance. The Object Management Group (OMG) naming objects support binding of an object to a name in a Naming Context, such as a directory. This naming object is extended to support dynamic attributes, or Properties, and searching based on these Properties. The ExtendedNamingContext is a subclass of the Naming Context that introduces properties, indexes, and searches on these properties.

Properties are typed and named values that are dynamically associated with objects that are defined outside the type system. Properties find many uses such as object classification, reference counting, and the like. Property is a tuple-<name, value> where "name" is a string and the "value" is an IDL (define) that denotes the value of the specified property. Clients can set, delete, and manipulate properties. Iterators are provided to return property lists when the number of properties exceeds the number expected by the client. Thus, the properties' extensions to the OMG module allow clients to:

1) dynamically associate named value pairs for objects outside the static IDL type system; and
2) provide batch operations to deal with sets of properties as a whole.

In this system, the client needs a way to limit the scope of the search, to this purpose filters have been provided that allow clients to limit the scope of the search by specifying constraints. "Properties" along with "Constraint Expression" provide the needed filtering mechanism.

The object search module that uses attributes and properties should return object references according to a set of predicates. The search space can be very large and the mechanism has to be extendable so as to be able to add to the search space seamlessly. The search space may span multiple address spaces with a large number of objects to be searched. The object search module will also need to support a particular form of federation and return object references that are held by Naming Context extensions in the global name space. Further, the mechanism should also be able to handle attributes as well as properties.

The above as well as additional objectives, features, and advantages of the present invention will become apparent in the following detailed written description.

SUMMARY OF THE INVENTION

According to the present invention, an information-handling system operable within a distributed object computing environment (DOCE) is disclosed that includes an object-based program for controlling object searching in a constraint-based filtering mode over said DOCE. The object-based program for controlling object searching further comprises means for providing hierarchical storage of a name/binding value during a search. Additionally, the object-based program includes a means for providing the addition of properties as name/value pair sequence to each node within a tree search performed by the object-based program. Further, the search mechanism includes means for providing recursive searching of the group properties as well as means for providing meta-knowledge of the class within the DOCE for attribute search. Moreover, the system includes means for invoking a base-filterable class, which introduces methods that verify whether an object satisfies a given filter, and where the base-filterable class further provides a filterable subclass that provides the methods needed to build a filter. The filterable subclass is able to parse a constraint string, check for grammatical errors, and reject selected filter constraints based on type incompatibility based on the meta-knowledge.

Supplementally, the means can be loaded on a computer-readable medium wherein means are provided for performing searching over the DOCE in such a manner as to support properties, searching, and indexing over the DOCE. Additionally, a method is disclosed based on the principal mechanism described above wherein the steps for performing searching across the DOCE include, first, performing a search across the DOCE and, second, providing constraint-based filtering to the search to provide more robust searching with less false hits.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 shows the constraint graph for a simple constraint;

FIG. 8 shows the constraint graph for a constraint with a logical operator; and

FIG. 9 is a flowchart depicting the process filter node mechanism according to the present invention.

DETAILED DESCRIPTION OF PREFERRED EMBODIMENT

Figure 1:
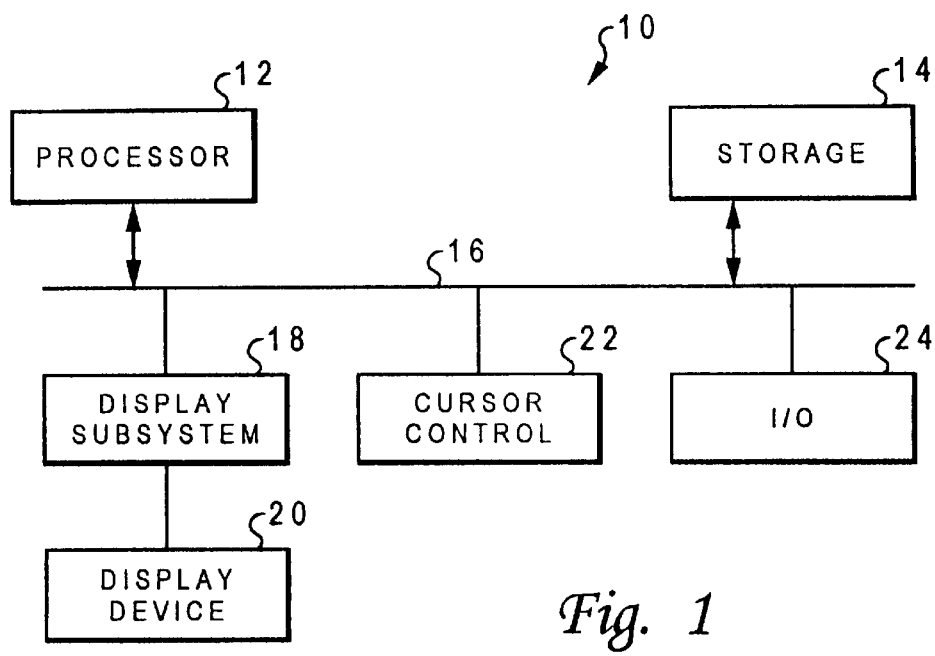
FIG. 1 is a block diagram of a system for executing the method according to the present invention.
Figure 2:
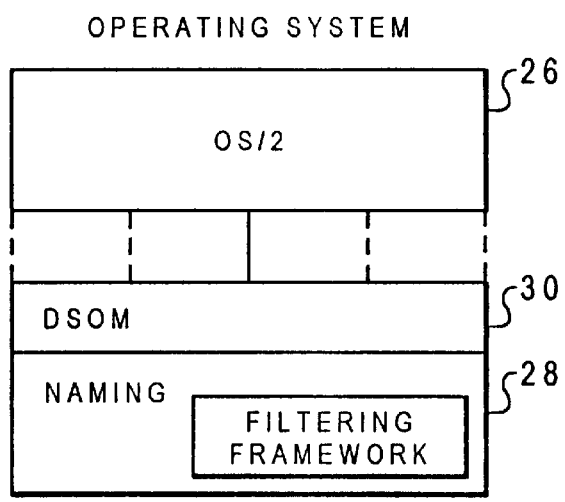
FIG. 2 is a block diagram showing the operating system platform and system object model programs supporting the present invention.

Referring now to FIGS. 1 and 2, on an information-handling system 10 and an operating system environment for the present invention are now described.

An information handling system 10 may be a graphics workstation or the like with a powerful processor 12, a storage system 14, a system bus 16, display subsystem 18 controlling a display device 20, a cursor control device 22, and an I/O controller 24, all connected by system bus 16. The information-handling system 10, shown in FIG. 1 may be operated by a commercially available, well-known multitasking operating system such as OS/2 (OS/2 is a registered trademark of International Business Machines Corporation). Among many tasks that the OS/2 operating system controls, upon operating information-handling system 110, is the execution of program SOMobjects, which is a commercially available product of International Business Machines Corporation.

The method and article of manufacture of the present invention may be incorporated in the SOMobjects program 28, which is shown in detail in FIG. 2 which is a subset of the DSOM 30. DSOM 30 operates in conjunction with the OS/2 operating system 26.

The original OMG naming module supports finding of the object to be named in a Naming Context (i.e., a directory). The subject matter of the U.S. Pat. No. 5,878,260, issued Mar. 2, 1999, previously incorporated by references for all purposes, extends the original module to support Properties, searching (finding bindings, given restraints on Properties), and indexing (or speeding up the search on certain property names). The Extended Naming Context (ENC) is a subclass of the OMG Naming Context (NC) then introduces Properties, searching and indexing. The present invention provides for an efficient search mechanism over a distributed object system, which is also known as a distributed object computing environment (DOCE) and is well known to those skilled in the art. The invention can be equally applied to static IDL (attributes) as well as "Properties." The present invention introduces four main factors in performing searching. One, the system provides hierarchical storage of the name/binding. Two, the system provides addition of Properties as name/value pair sequence to each node. Three, the system provides for recursive search for Properties. Fourth, the system provides meta-knowledge of the class for attribute search.

To implement these four factors, the present invention introduces three classes. The first class is BaseFilterable, the second class is filterable, and the third is the meta-class m_filterable.

The BaseFilterable class introduces methods that verify whether an object satisfies a given filter: evaluation of the filter is recursive. The filterable class and the m_filterable meta-class inherit from BaseFilterable and therefore are "filterable." Moreover, m_filterable introduces the methods needed to build a filter. The class m_filterable parses a constraint string, checks for grammatical errors, and uses its meta-knowledge about the class to reject certain filter constraints based on type incompatibility (e.g., count=="hello"; is rejected if property/attribute "count" is a number) or nonexistence of a given property/attribute (e.g. count==12; is rejected if attribute "count" does not exist). The solution can handle any constraint language and in a preferred embodiment, the invention is implemented in SOMobjects 3.0 Naming Service using the language specified in the OMG lifecycle specification.

The three new classes are used to search on Attributes, as well as Properties, where Properties are characterized as "dynamic attributes." Search is initiated on a target-naming context that takes a "distance" parameter. Distance eliminates potential deadlocks with cyclic graphs. The traversal of the constraint graph is a combination of in-order and post-order traversal:

```
go_down (node, stack) {
    if (node->right.subtree == EMPTY)
        node -> right.processed = FALSE
    node->processed = FALSE;
    /* Combination of INORDER abd POSTORDER traversing of the
    tree.
    In certain cases (AND/OR), there may not be a need to process the
    right subtree. Since we try to process the node twice, record
    processing status in the node itself
    */
    go_down (node->left, stack)
    process (node)
    if (node->right != EMPTY AND node->right.processed == FALSE)
        go_down (node->right)
    process (node, stack)
}
```

The search builds a list of "names" relative to the target object and satisfies the given criteria.

One advantage of this filter framework is that it can be adapted to filter any object. Another advantage is that the BaseFilterable class and its subclasses are more extendable, which means a user can add a node to the tree more readily. Further, the BaseFilterable class and its subclasses works off *Attributes* as well as *Properties*.

The basic concepts of the BaseFilterable module classes have thus been described. What now follows are specific embodiments for implementing the filter structure according to the present invention.

Figure 3:
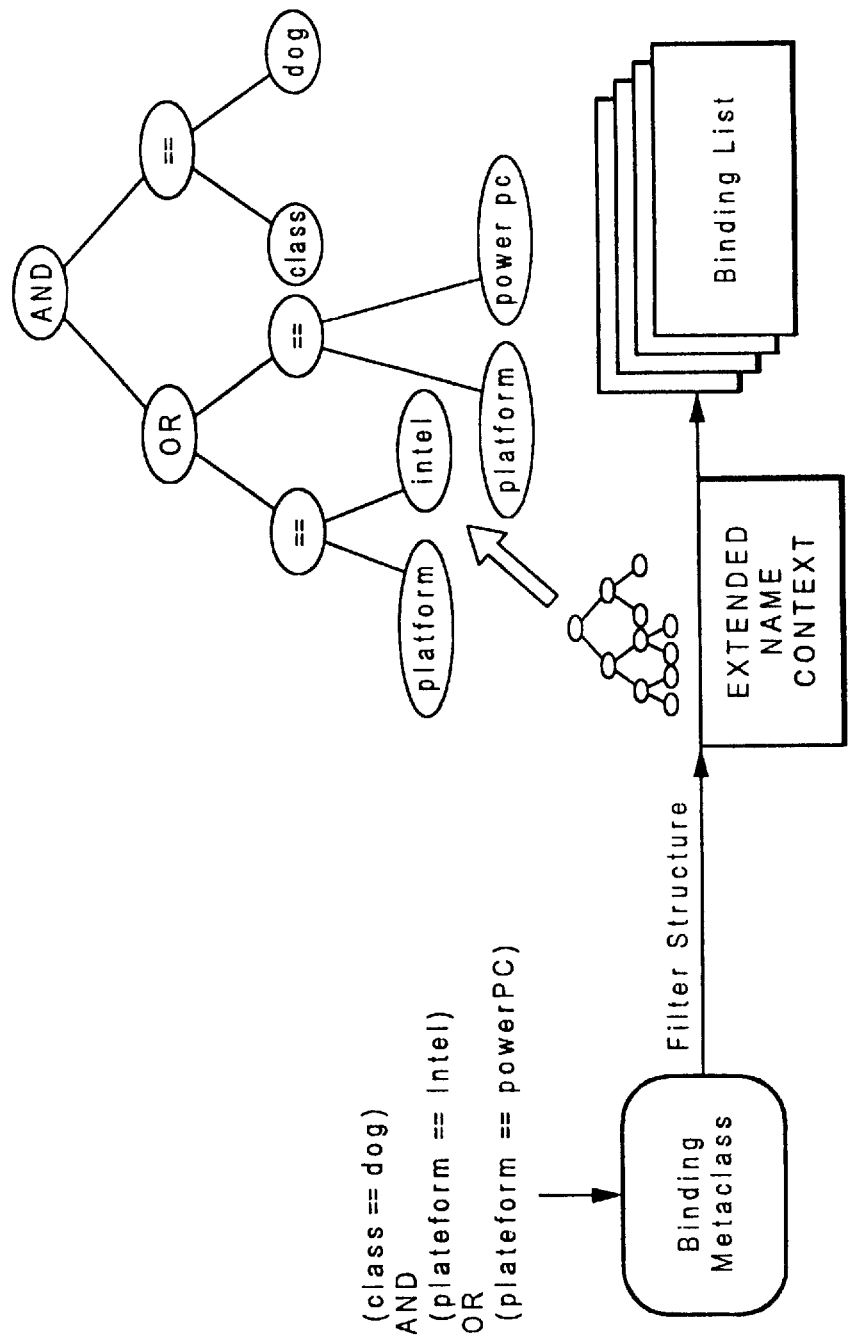
FIG. 3 is a flow diagram of a sample filtering operation using a boolean AND operation of a class where a class is defined as dog and a platform.

FIG. 3 is a flow diagram of a sample filtering operation. The build_filter method is invoked on the filterable object mainclass. This method takes a constraint string as the parameter. In this example, the constraint is "(class=='dog') and (platform=='intel') or (platform=='powerPC')" where class and platform are both known property names. The build_filter method parses the constraint and checks for its grammatical correctness; it then builds the filter structure shown in FIG. 3 (tree). In the next step, the filter structure is given to every object to be filtered (in our case, ENCs) and corresponding to the metaclass. At that time, the filterable objects access their property/attributes symbolically (i.e., by name) and use their values to compute the boolean returned by the check_filter method (illustrated in FIG. 4).

Figure 4:
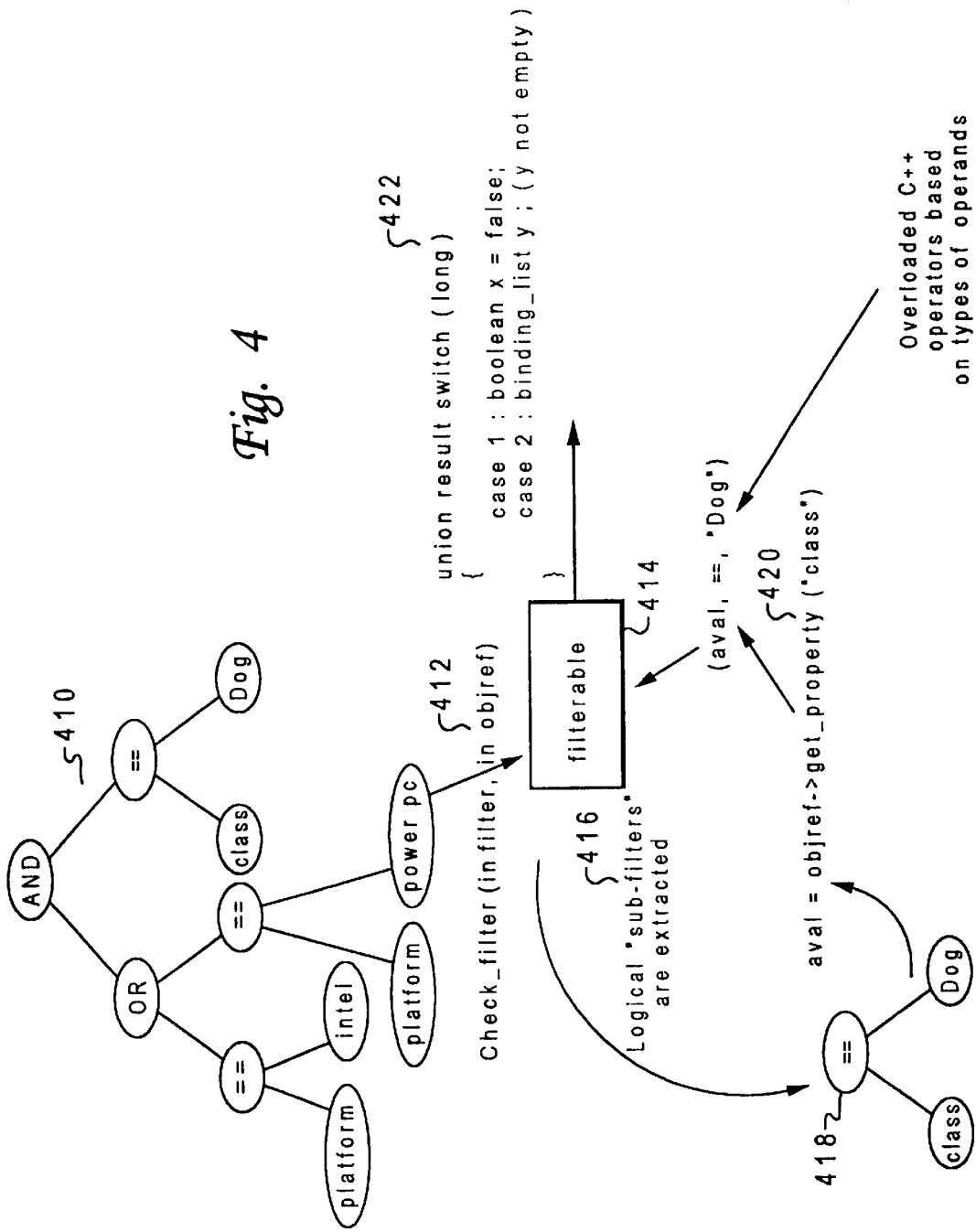
FIG. 4 is a flow diagram of the operation of filtering a name search request.

FIG. 4 is a flow diagram corresponding to the filtering method "check_filter." The check_filter method is given a filter structure and a reference to an object supporting the get_property method (or get_attribute_by_name method). In the case depicted here, a reference to a given naming context is passed. In block 410, we show the constraint graph. Next, in block 412, the filtering begins by invoking the check_filter method on the filterable object "a filterable," block 414. As part of this invocation, logical subfilters are extracted (block 416). Each subfilter is evaluated. In this example, one subfilter corresponds to the constraint "class=='dog'." The property named "class" is accessed by name and its value is checked against the string "dog." All filter operators (and, or, ==+, etc.) are implemented as overloaded C++ operators and can deal with all relevant data types. The result of "check_filter" is either false or true and a list of bindings (block 414).

Figure 5:
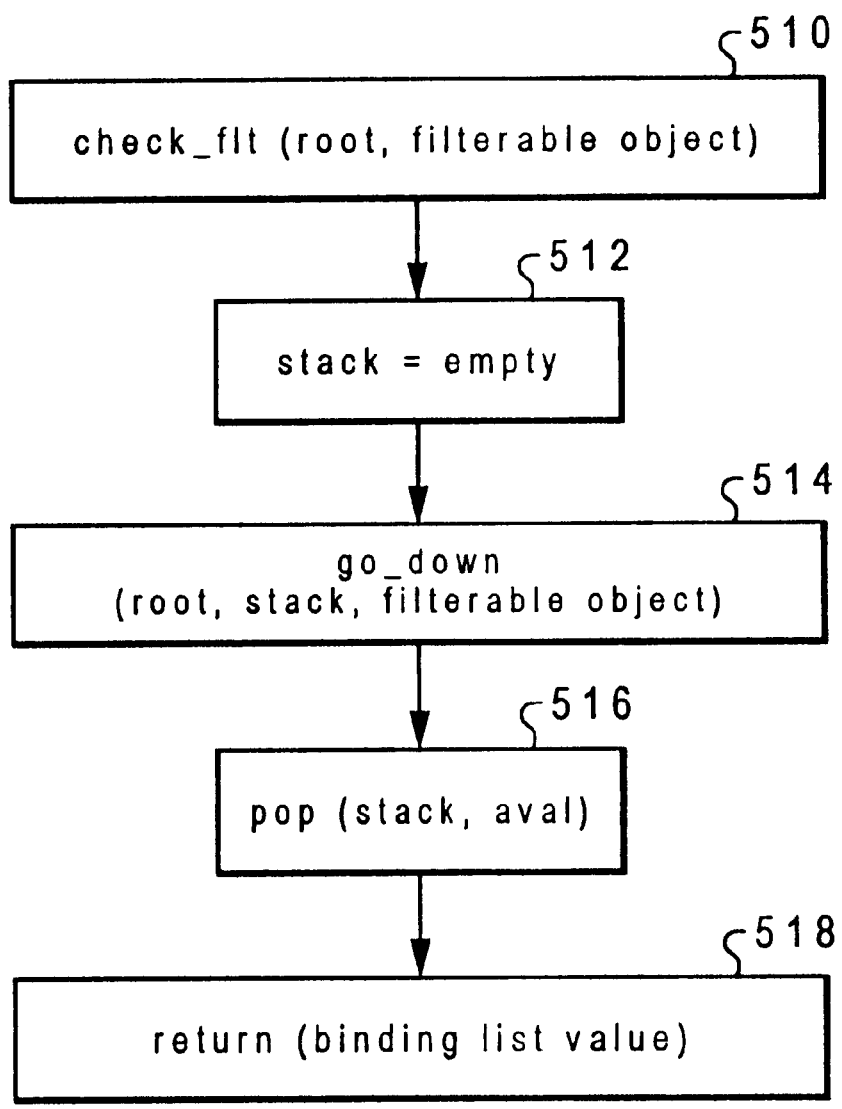
FIG. 5 is a flow diagram of the operation of filtering a name search request.

The flowchart of FIG. 5 further depicts the check_filter method. Initially, in block 510, the check_filter method is invoked with parameter the root node of the filter structure since the filter structure is a tree and an object reference.

This object has to support methods to access attributes/property symbolically and return their value. In the ENC case, the method is get_property, but it may, in general, be any method taking a string as input and returning a value in an any (structure carrying its type and value). In block 512, the internal variable stack is initialized to be empty (the stack is to contain any's) and then proceed to block 514. In block 514, the go_down (root, stack) function is invoked and executed. Go_down is further depicted in FIG. 6. After returning from executing the go_down function, the system proceeds to block 516. At this point, the stack of any's should contain only one element of type union (the result of the recursive evaluation made in go_down). In block 516, the top element in the stack is extracted: pop(stack, aval) puts in the initially empty variable aval, the top element of the stack. The system returns its value in block 518. In our case, the value is either the boolean false or a list of binding.

Figure 6:
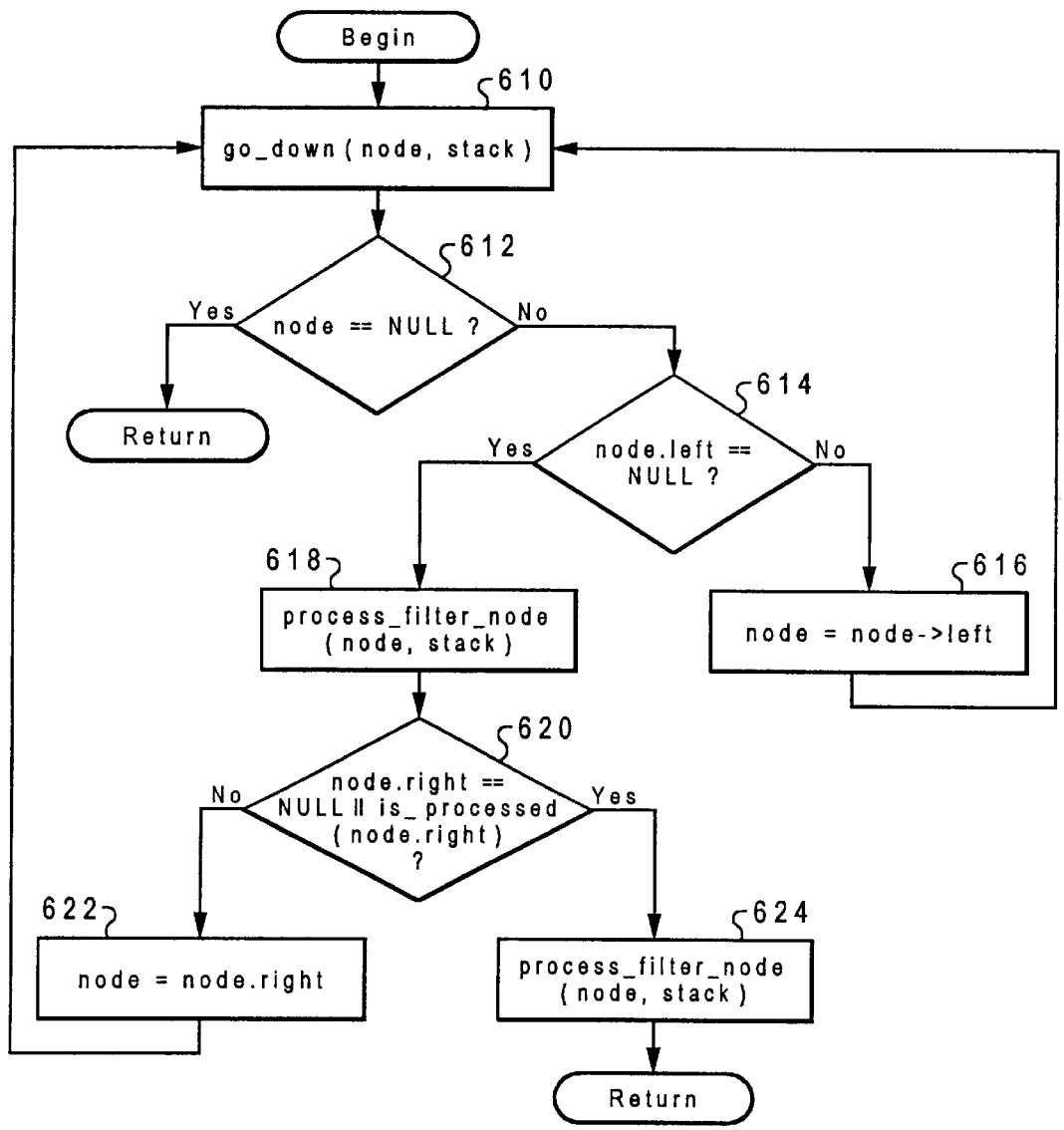
FIG. 6 is a flowchart depicting the implementation of the go_down mechanism.

FIG. 6 is a flowchart depicting the implementation of the go_down mechanism that evaluates recursively the filter and puts the result of the evaluation in the stack passed by the check_filter_method. In block 610, a call to go_down is made with a given filter node (see the node structure below). This node is checked to see whether it is a null node (block 612). If yes, the call returns. If not, the system proceeds to block 614, where the left child of the node is determined whether to be null or not. If it is not a null node, the system goes to block 616, where it updates the current node to be this left child node and then proceeds to block 610 by making a recursive call to go_down with the current node being the left child node. If the left node is a null node, then the system proceeds to block 618, where the process_node_mechanism is invoked for this particular node and stack. Process_filter_node is described in FIG. 9. Next, in lock 620, the right child of the node is determined to be null or not. If not, the system goes to block 622, where it updates the current node to be this right child and then proceeds to block 610 by making a recursive call to go down with the current node being the right child. Otherwise, if the right child is null, the system proceeds to block 624 where process_filter_node is invoked and then returns.

The data structure for each particular filter is shown below:

```
struct node{
    node_type type;
    any value;
    boolean processed;
    node *left;
    node *right;
};
```

FIGS. 7 and 8 show two example constraints. FIG. 7 shows the graph that represents the constraint string "class==dog." Block 710 represents the operator node. The operator "==" is stored as an "any" in block 710. Block 714 is an identifier (IDENTIFIER) node and block 712 is a Value (VAL) node.

FIG. 8 shows another constraint that contains a logical operator. The constraint string is "class==dog AND platform==intel." Block 714 and block 814 represent the identifiers in the string, namely class and Platform. Block 810 shows the node that represents the AND operator. Block 710 is the node that represents the "==" operator in "class ==dog" subexpression. Block 711 shows the node that represents the "==" operator in the "platform==intel" subexpression.

The flowchart for the process-filter-node is disclosed and depicted in FIG. 9. Process_filter_node gets invoked by go-down for every node in the constraint graph. Process_filter_node get passed a "node" representing the target node and a stack that contains the result of the previous operator.

In block 912, the function checks to see if the node that was parsed in has been processed, and if so, it returns to the calling routine. Otherwise, the mechanism proceeds to block 914 where a determination is made on the node type. If the node in question is a value (VAL), it proceeds to block 916; if an identifier (ID), it proceeds to block 922; if an operator (OP), it proceeds to block 926.

At block 916, an IDL "any" is built from the "value" that was stored in the node. The built "any" value is then pushed onto the top of the stack in block 918. It then proceeds to mark the node as being processed (in block 936) and returns.

If the node type is an identifier (block 922), it proceeds to get the value of the said property. The obtained value is then pushed onto the stack in block 918.

If the node type is an operator, block 926 determines the type of the operator.

If the operator in question is a unary minus (UMINUS) or NOT, a determination is made whether the operand is processed in block 928. If the operand is not processed, the method returns. If the operand is processed, the value of the operand (which was stored on the stack) is popped in block 930. Block 932 computes the unary operation and stores the returned value in result. The "result" is then pushed on the stack in block 934. Block 936 marks the node as processed and control then returns.

If the type of the node is block 926, an OR operator, the function proceeds to block 949. Block 949 checks if the node on the right side of the OR operator has been processed. If it is (yes), then it proceeds to block 944. Block 944 determines if the stack top is true. If it is true, control is transferred to block 950.

Blocks 942, 946, and 968 compute the result of the OR operation done on the top elements of the stack.

If the operator type happens to be anything else (other), the system again determines whether the right node is to be processed and, if not, returns, thus completing the processing. Otherwise, if the right node needs to be processed, the method proceeds to block 942 and finishes the blocks from 942–950.

Likewise, if the node type is an AND operation, the method again determines in block 954 if the right node is to be processed and, if not, proceeds to block 956 where the stack entry at the top level is determined. If true, the method goes to block 950. If false, a False is returned.

While the invention has been particularly shown and described with reference to a preferred embodiment, it will be understood by those skilled in the art that various changes in form and detail may be made therein without departing from the spirit and scope of the invention.

What is claimed is:

1. A method for performing searching across a distributed object computing environment (DOCE), comprising the steps of:
    performing a search across said DOCE; and
    providing constraint-based filtering to said step of searching within said DOCE; said filtering employing an object-based program and further including:
        providing hierarchical storage of a name/binding value during a search;
        providing the addition of properties as name/value pair sequence to each node within a tree search conducted by said object-based program;

providing recursive searching of a group of properties;
invoking a base filterable class which provides a filterable subclass with appropriate methods needed to build a filter and parse a constraint string wherein said base filterable class includes methods that verify whether an object satisfies a given filter.

2. A method for performing searching across a DOCE according to claim 1, further comprising:
providing meta-knowledge of a class within said DOCE for attribute search.

3. A method for performing searching across a DOCE according to claim 1, further comprising:
invoking a base filterable class, which introduces methods that verify whether an object satisfies a given filter.

4. A method for performing searching across a DOCE according to claim 3, wherein said step of providing a base filterable class further comprising:
providing a filterable subclass that with appropriate methods needed to build a filter.

5. A method for performing searching across a DOCE according to claim 4, wherein said filterable subclass further comprising:
parsing a constraint string.

6. A method for performing searching across a DOCE according to claim 1, further comprising:
checking for grammatical errors.

7. A method for performing searching across a DOCE according to claim 1, further comprising:
rejecting selected filter constraints based on type incompatibility as defined by meta-knowledge.

8. A computer-readable medium, comprising:
means for performing searching over a distributed computing (DOCE) environment in such a manner as to support properties, searching, and indexing over said DOCE; wherein said means includes an object-based program further comprising:
means for providing hierarchical storage of name/binding value associated during a search;
means for providing the addition of properties as name/value pair sequence to each node within a tree search conducted by said object-based program;
means for providing recursive searching of a group of properties;
means for invoking a base filterable subclass which includes a method needed to build a filter and means for parsing a constraint string wherein said base filterable class includes methods that verify whether an object satisfies a given filter.

9. A computer-readable medium according to claim 8, wherein said object-based program further comprises:
means for invoking a base filterable class, which introduces methods that verify whether an object satisfies a given filter.

10. A computer-readable medium according to claim 8, wherein said object-based program further comprises:
means for providing meta-knowledge of a class within said DOCE for attribute search.

11. A computer-readable medium according to claim 9, wherein said means for providing a base filterable class further comprises:
a filterable subclass that provides the methods needed to build a filter.

12. A computer-readable medium according to claim 11, wherein said filterable subclass further comprises:
means for parsing a constraint string.

13. A computer-readable medium according to claim 8, wherein said filterable subclass further comprises:
means for checking for grammatical errors.

14. A computer-readable medium according to claim 8, wherein said filterable subclass further comprises:
means for rejecting selected filter constraints based on type incompatibility as defined by meta-knowledge.

15. An information-handling system operable within a distributed object computing system environment (DOCE), comprising:
one or more processors;
a storage system;
one or more I/O controllers;
a system bus connecting said processors, the storage system, and the I/O controller;
an operating system program for controlling operation of the information handling system; and
an object-based program operating in association with the operating system program for controlling object searching in a constraint-based filtering mode within said DOCE; said object-based program further comprising:
means for providing hierarchical storage of a name/binding value during a search;
means for providing the addition of properties as name/value pair sequence to each node within a tree search conducted by said object-based program;
means for providing recursive searching of a group of properties;
means for invoking a base filterable class which includes a filterable subclass that provides a method for building a filter and means for parsing a constraint string, wherein said base filterable class includes methods that verify whether an object satisfies a given filter.

16. A system according to claim 1, wherein said object-based program further comprises:
means for providing meta-knowledge of a class within said DOCE for attribute search.

17. A system according to claim 1, wherein said filterable subclass further comprises:
means for checking for grammatical errors.

18. A system according to claim 1, wherein said filterable subclass further comprises:
means for rejecting selected filter constraints based on type incompatibility as defined by meta-knowledge.

* * * * *